United States Patent [19]
Van Welzen et al.

[11] 3,773,648
[45] Nov. 20, 1973

[54] ELECTROPHORESIS APPARATUS

[76] Inventors: Henk Van Welzen, 5 Koningin Emmalaan, Den Hoorn; Marius Hendrik Johan Zuidweg, Rietveldsetoorn, Delft, both of Netherlands

[22] Filed: Oct. 25, 1972

[21] Appl. No.: 300,597

[30] Foreign Application Priority Data
Nov. 8, 1971 Netherlands.................. 7115364

[52] U.S. Cl............................. 204/299, 204/180 G
[51] Int. Cl............................................ B01k 5/00
[58] Field of Search................... 204/180 G, 180 R, 204/299

[56] References Cited
UNITED STATES PATENTS

| | | | |
|---|---|---|---|
| 3,129,158 | 4/1964 | Raymond et al............... | 204/180 G |
| 3,135,674 | 6/1964 | Ruetschi........................ | 204/299 X |
| 3,326,790 | 6/1967 | Bergrahm...................... | 204/180 G |
| 3,346,479 | 10/1967 | Natelson........................ | 204/299 X |
| 3,539,493 | 11/1970 | Dorman.......................... | 204/299 |
| 3,575,841 | 4/1971 | Harris............................. | 204/299 |

Primary Examiner—John H. Mack
Assistant Examiner—A. C. Prescott
Attorney—Martin Fleit et al.

[57] ABSTRACT

A preparative electrophoresis apparatus, comprising a funnel-shaped zone for the electrophoresis gel which is open at the upper side, a zone for circulating a first buffered solution thereabove containing a first electrode, said funnel-shaped zone at its lower end passing into a narrow aperture provided with a bottom enabling liquid to pass but to support the gel, said narrow opening being in connection with an elution chamber directly connected to an outlet, said elution chamber being further connected to a small conical jacket around the funnel-shaped zone, said conical jacket being connected with a zone containing a second electrode and being provided with an inlet for circulating a second buffered solution, said inlet being situated between the zone containing the second electrode and the elution chamber, said elution chamber further being provided with a downwardly directed outlet for the eluate, the apparatus further comprising means for cooling the liquids and the gel, this apparatus permitting a high separation force.

12 Claims, 3 Drawing Figures

ELECTROPHORESIS APPARATUS

BACKGROUND OF THE INVENTION

Preparative electrophoresis apparatuses normally comprise an upper electrode zone, a separation zone containing a cyclindrically shaped gel, an elution or collection zone and a lower electrode zone. The separation of the components, caused by the introduction of a potential gradient in the gel, results in the fact that the components are going to migrate with different speeds so that they leave the gel subsequently and enter into the elution zone. This zone is perfused by a buffered solution taking the components along to, for example, a fraction collector, from which they can be removed for further investigation.

A great variety in constructions of electrophoresis apparatuses is known, and much attention is paid to the shape of the elution chamber which has to fulfill several, partially conflicting, requirements. The absence of dead space and a relatively high flow speed are necessary to avoid the danger of contamination of fore-going fractions. The greater part of the apparatuses have their outlet at the side (see, e.g., P.H. Duesberg, Anal. Biochem. 11 (1965) 342). This is unfavourable because of the presence of a threshold at the outlet. The elution zone proposed by Schenkein (Anal. Biochem. 25 (1968), 387) has an outlet directed downward, thus avoiding the threshold.

A high flow speed of the buffered solution in the elution chamber necessary to obtain an as sharp separation as possible of the components, may result in an excessive dilution of the components, so that analysis thereof is made more difficult. This may be improved by decreasing the sizes of the elution chamber. Duesberg (loc. cit.) applied a conically shaped lower end of a mainly cylindrical gel, so that a smaller elution chamber was sufficient.

Further, the bottom of the separation zone generally consists of a semipermeable membrane, allowing the ions to migrate through it, thereby providing the electrical contact, but preventing the components of the material to be investigated (normally protein components) to pass.

However, membranes have disadvantages, for example, the so-called Bethe-Toropoff effect (H. Svensson, Adv. Protein Chem. 4 (1948) 251) and the possibility of denaturation or absorption. A sintered glass bottom is proposed in an apparatus described by Porath (Nature 182 (1958) 744) wherein a downward motion of the components of the sample is hindered by an upward flow of buffered solution.

It is an object of the invention to provide an electrophoresis apparatus wherein the above-mentioned advantages are combined with other advantages, as discussed hereinafter, and the disadvantages are eliminated.

SUMMARY OF THE INVENTION

The invention provides a preparative electrophoresis apparatus, comprising a funnel-shaped zone for the electrophoresis gel which is open at the upper side, a zone for circulating a first buffered solution thereabove containing a first electrode, said funnel-shaped zone at its lower end passing in a narrow aperture provided with a bottom enabling liquid to pass but to support the gel, said narrow opening being in connection with an elution chamber directly connected to an outlet, said elution chamber being further connected to a small conical jacket around the funnel-shaped zone, said conical jacket being connected with a zone containing a second electrode and being provided with an inlet for circulating a second buffered solution, said inlet being situated between the zone containing the second electrode and the elution chamber, said elution chamber further being provided with a downwardly directed outlet for the eluate, the apparatus further comprising means for cooling the liquids and the gel.

In this construction, there is no membrane for holding the components of the material to be investigated, at all, and this is not necessary since the second buffered solution is introduced between the elution chamber and the zone of the second electrode, so that by a proper adjustment of the flow speed of the second buffered solution all separated components are taken along without the danger of components migrating from the elution chamber to the second electrode and escaping from investigation. The absence of the membrane has a further advantage, i.e., absorption is avoided and electric effects of the membrane are absent. It is an advantage of the funnel-shaped separation zone that the sample may be applied in a relatively thin layer, causing a high separating power. Further, the elution chamber of the apparatus according to the invention is small, and the buffered solution is introduced in an annular manner, thus avoiding an inlet tube. This results in the advantage that there is no dead space, while the smallness of the elution chamber and the manner of introduction of the buffered solution further increase the separating power since mixing of fractions is avoided to a high extent, The volume of the elution chamber is small, it is about 0.01 to 1 ml, preferably 0.05 to 0.2 ml. The construction according to the invention allows a very efficient elution without the necessity of the use of an excessive amount of buffered solution, thus avoiding excessive dilutions which is of advantage for the further investigation of the eluate.

It is an additional advantage of the construction of the invention that the part of the gel where the electric field, and thus the heat formation, is greatest, i.e., at the lower end of the funnel-shaped zone, is most intensively cooled by the buffered solution since the flow speed of the buffered solution in that region of the conical jacket is highest.

It is an aspect of the invention to provide an apparatus wherein the apparatus consists of an upper part comprising a conically shaped part of the wall defining the funnel-shaped zone, an outer wall defining the circulating zone for the first buffered solution, and the first electrode, said upper part fitting to a lower part comprising the outer wall of the conical jacket, the second electrode, the inlet for the second buffered solution and at the lower end of the conical wall a somewhat diverging part cooperating with a plug provided with a central vertical passage, all in a manner such that the side walls of the elution chamber are formed by the lower part, the upper wall thereof by the upper part and the bottom is formed by the plug. This embodiment has the advantage that the sizes of the elution chamber are well defined and are still well approachable to be cleaned and to pour the gel in the upper part. It is appreciated that a carrier in powder form, such as Sephadex (trade mark) or glass powder, may be used. In an advantageous embodiment of the invention, the several parts are provided with ground glass joints (Schliffstuecke). Further, the circulation zones for the buffered solutions are preferably provided with overflows, so that excessive liquid pressures are avoided. The circulation zone of the first buffered solution is preferably provided with the cooling finger extending into the funnel-shaped zone, while a cooling vessel is applied about the thin conical jacket and a part of the inlet for the second buffered solution. This cooling finger is preferably provided with an additional jacket ending at the lower end of the zone for the first buffered solution and provided at its lower end with apertures about the circumference allowing the first buffered solution to be introduced. In this way, the first buffered solution may be introduced into the circulation vessel with a reasonable precise temperature.

In a preferred embodiment of the invention, the bottom of the lower end of the funnel-shaped zone consists of sintered glass. Further, the first electrode, is preferably height adjustable. By a proper adjustment of this electrode, the separation may be optimalised.

The bottom of the collection zone may further be provided with a bottom ring to decrease the volume of the elution chamber.

The invention is further elucidated by the attached drawing, wherein an advantageous embodiment of the invention is shown.

DETAILED DESCRIPTION OF THE DRAWINGS

Figure 1:
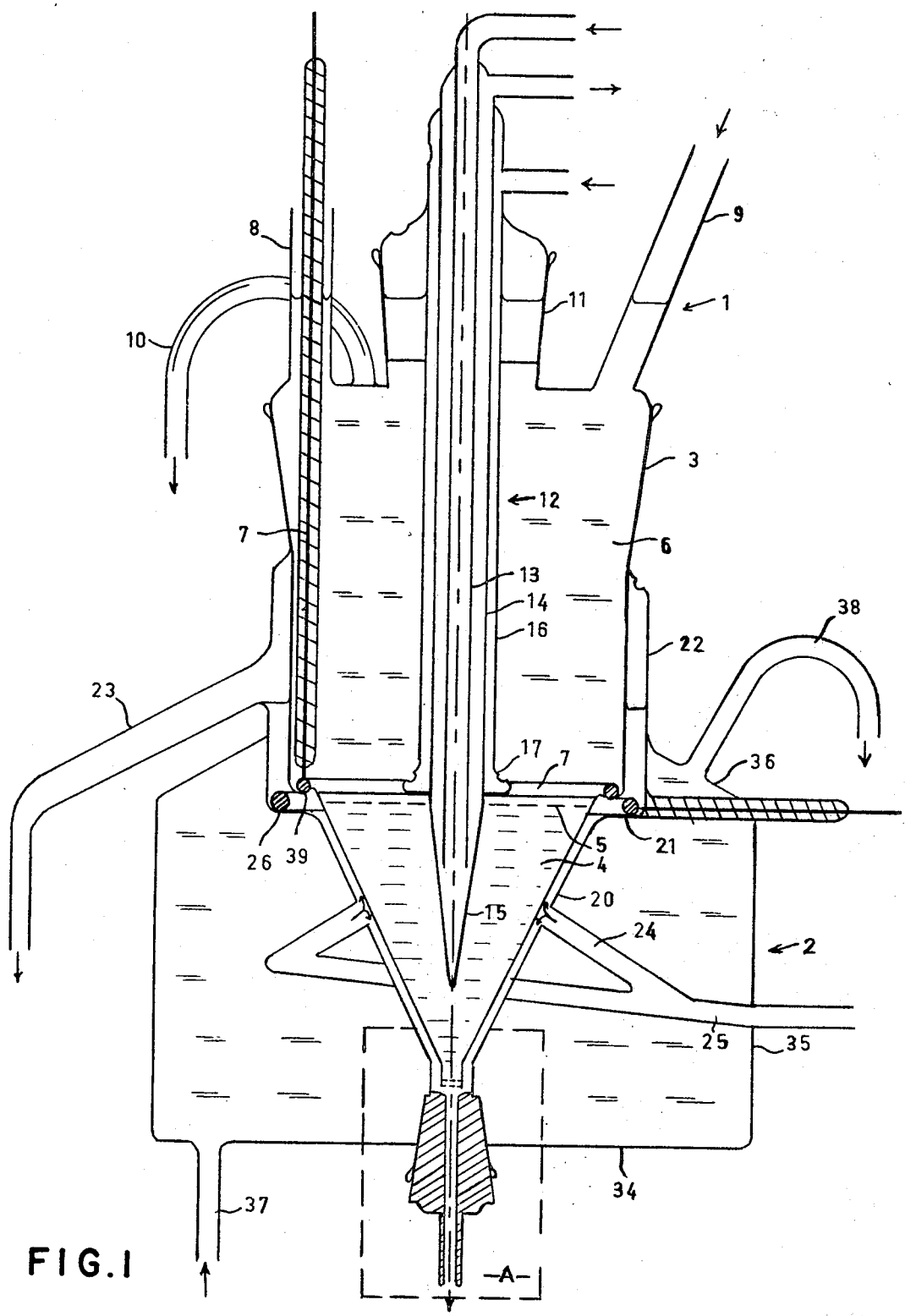
FIG. 1 shows a vertical cross section through the elektrophoresis apparatus according to the invention.

The apparatus shown in FIG. 1 consists of an upper part 1 and a lower part 2, fitting to each other by means of a ground glass joint 3. The upper part 1 comprises a funnel-shaped separation zone 4, in which the electrophoresis gel may be applied about up to the height of the dotted line 5. The zone 6 thereabove is adapted to circulate a buffered solution and a vertically adjustable electrode 7 is applied in this zone. In the device shown in the drawings, the electrode is annular in order to induce as good a homogeneous electric field as possible. This electrode 7 is connected to the outside via a joint inlet tube 8, and is height adjustable. The electrode may in its lowest position rest in an annular channel 39, so that the lowest position of the electrode is fixated.

The zone 6 is further connected to an inlet tube 9 for the introduction of the sample to be investigated, and an overflow 10 for removal of the used buffered solution.

The upper end of the zone 6 is further provided with a ground glass joint 11 and a cooling finger 12 is introduced into it. The cooling finger comprises a central inlet tube 13 for cooling liquid, surrounded by a first jacket 14 for returning the cooling liquid. The lower end of the inlet tube 13 is connected to the jacket 14, which, in that region, is conically shapped in order to minimize disturbance of the homogeneity of the electric field. The jacket 14 is surrounded by a second jacket 16 ending just above the dotted line 5. The lower end of the jacket 16 is provided with apertures 17 applied about the circumference thereof. The buffered solution may be introduced into this zone 6 via the jacket 16. The buffered solution serves the purpose of electrical contact between electrode 7 and the gel applied in the separation zone 4.

Figure 2:
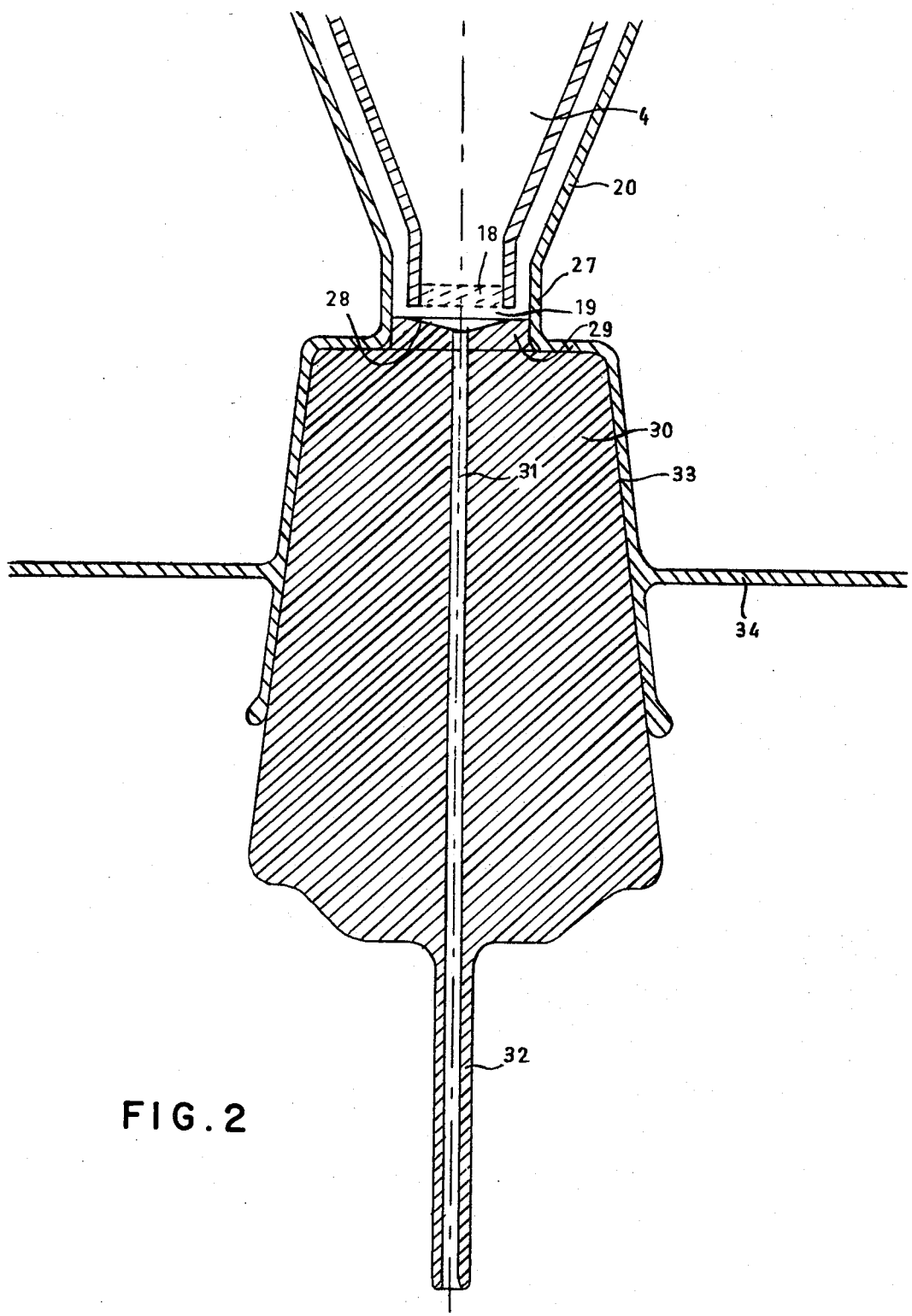
FIG. 2 shows a detail, in an enlarged scale, of the part in FIG. 1 indicated by rectangle A.

The lower end of the separating zone 4 (as shown in detail in FIG. 2) is provided with a bottom 18, not only serving the purpose of bottom of the separation zone 4, but also serving the purpose of passage of the components separated by electrophoresis. The bottom consists of sintered glass. The separated components are collected in the elution chamber 19 formed by walls of three parts of the apparatus, as discussed hereinbelow.

The lower part 2 of the apparatus comprises a conical wall 20 applied in such a manner that when the upper part 1 is placed on the lower part 2, a very small space between the wall of the separating zone 4 and the wall 20 is formed. In the embodiment shown, the distance between the walls is 0.4 mm, but this distance may be selected greater or smaller, if desired.

The wall 20 is connected to a cylindrical wall 22 via a small seat 21. The cylindrical wall is fixed to the outer part of the ground glass joint 3. An overflow tube 23 is applied to the wall 22. The wall 20 is, near the middle thereof, provided with a set of nearly axially placed inlet tubes 24 regularly distributed about the circumference. The whole set of inlet tubes 24 is a part of a branche pipe connected to a joint inlet tube 25.

The tube 25 permits the introduction of a second buffered solution passing the conical space, and the elution chamber 19 taking along the separated components, and removing via an outlet 31 with additional joint 32 and via a pump to, e.g., a fraction collector. A part of the buffered solution flows to the space within the cylindrical wall 22 and is removed via the overflow 23. During passage of the space within the wall 22, the buffered solution passes the second electrode 26 fixed to the apparatus and resting on the set 21. This electrode is connected to the outside through the wall 22. Electrical contact with the gel in the zone 4 is made via the buffered solution in the conical space and the bottom 18.

The lower end of the conical space formed by the conical wall of the separation zone 4 and the wall 20 ends in the elution chamber 19. The side walls of the elution chamber are formed by a cylindrical part 27 of the lower end of the wall 20. The upper part of the elution chamber is formed by the bottom 18, and the lower end is formed by the upper part 28 of an annular filling-up piece 29 of a plug 30. The plug 30 is provided with a central channel 31 connected to the elution chamber 19. The lower end of the channel 31 is connected to an additional joint 32 of the plug. A flexible removal tube may be connected thereto, and gives connection with, e.g., a finely adjustable suction pump controlling the flow speed of the buffered solution. The upper end 28 of the filling-up piece 29 is, in the embodiment shown, conically shaped to the center, so that the buffered solution, in the elution chamber 19 being mixed with the separated components, may be removed easily. The plug 30 fits closely to the ground glass joint 33, applied in the bottom 34 which is part of a cooling zone of the lower part 2. The cooling zone is further enclosed by a cylindrical side wall 35 and a conically narrowing wall 36 connected to the cylindrical wall 22, said conical wall 36 enclosing the conical wall 20 with the branche pipe 24. A cooling liquid introduced by a tube 37 in the bottom 34 may circulate in the cooling zone. The cooling liquid is removed by a tube 38 in the conical wall 36.

The plug 30 may also be applied with a smaller ground glass joint, making the filling-up piece 29 redundant.

The apparatus shown is manufactured substantially entirely from glass (with electrodes of a Pt-Ir alloy) but it will be evident that other materials may be used, provided that they are electrically insulating, thermically conducting, mechanically strong and chemically indifferent for the chemicals to be used.

The apparatus is working as follows: a suitable gel is applied in the separation zone 4, and the apparatus is assembled by lowering the upper part 1, containing the gel, into the lower part 2, and placing the cooling finger 12 in its position. A sample to be investigated is applied to the gel through the tube 9. Buffered solutions are introduced through the jacket 16 and the inlet tube 25, respectively. Cooling is started and a voltage is applied between the electrodes 7 and 26, so that the sample in the gel in the funnel-shaped zone 4 is put to the action of electrophoresis and is separated into components. Due to the conical shape of the zone 4, concentration of the discs of the separated components occurs during the electrophoresis. The components leave the gel subsequently via the sintered glass bottom 18, and enter the elution chamber 19, where each of the entered components are mixed with buffered solution passing the elution chamber, and taking along the components subsequently through the outlet channel 31, which by means of a flexible tube is connected to a finely adjustable pump, pumping the buffered solution with the components to a fraction collector, collecting the components in the buffered solution separately.

For cooling by means of the cooling finger, it may be sufficient when the cooling liquid in the cooling finger is not running. Sometimes, it gives better results than by means of running cooling liquid.

Because of the smallness of the elution chamber (which is about 0.4 ml), the absence of dead space and the fact that the eluate is taken along in a parallel flow by the buffered solution, the separating power of the apparatus is high, whereby the symmetrical shape of the separation zone and elution chamber (enabling a very homogeneous electrical field) further contribute to a high separating power.

The invention is further elucidated by the following examples. In all of the examples, the above-described apparatus was used.

EXAMPLE I

A sample of bromophenol blue, methyl red, supracene violet and ponceau-S was used as an experimental sample. The separation was carried out at pH 9.3 and a temperature of 0 °C in a discontinuous anodic buffered system with chloride as leading ion and 6-aminocapronic acid as trailing ion. Electrode 7 was always used as the cathode. Variations were made in: the voltage, the use of the cooling finger, the location of the cathode and the removal rate.

Results:

a. Variations in voltage. By establishing the voltage in a manner that the current does not exceed 10 mA, no boiling phenomenons are caused in the lower part of the gel, resulting in a proper electrophoresis. For the present circumstances, the initial voltage turned out to be 200 to 250 V with corresponding currents of 7 to 9 mA. The current may be increased later, and voltages of over 750 V are applied without disturbing the normal picture. Such high voltages are normally not applied since the buffered solution would have to be passed with an unpractically high speed in order not to influence disadvantageously the separating power. The above-mentioned dye-mixture was separated properly, provided that the above-indicated requirements were fulfilled.

b. Use of the cooling finger. The best results were obtained with the cooling finger filled with cooling liquid, but not circulated thereby.

c. Location of the electrode 7. The best results were obtained with this electrode in its lowest position. With a higher adjustment of the electrode the discs became more convex.

d. Removal rate. The removal rate is dictated more or less by the voltage used. When removal is too slow, losses occur since the components, at least partially, escape into the direction of the electrode 26. With too high a removal rate, a too high dilution of the eluate is easily the result thereof. In the experiments of this example, good results were obtained at a removal rate of about 0.5 ml per minute.

EXAMPLE II

In this example a protease produced by an amylase-producing Bacillus strain was used as the sample. The separation was carried out under the circumstances indicated in example I. Electrode 7 was placed in its lowest position and the cooling finger, filled with cooling liquid but not run, was used. The buffered solutions were deaerated for several hours at about 5 °C before use, and were stored in vacuo until use.

Figure 3:
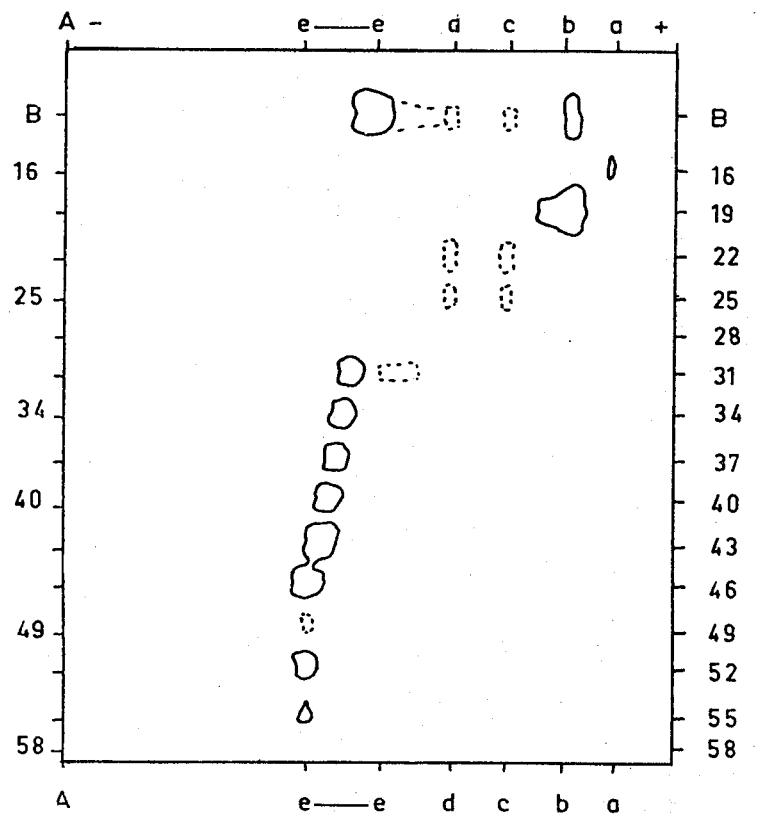

A sample of 100 mg of protease was applied to the gel. The experiment was started with a voltage of 250 V with a corresponding current of 6 mA. The total experiment lasted 24 hours. A fraction collector was used for collection of the components taken along with the buffered solution separately. The fraction collector was powered every 10 minutes. The removal was established to 11 drops per minute, so that fractions of 7 ml were collected in the beginning. Aliquots from the obtained fractions were brought on a "gel slab" for another electrophoresis apparatus for analytical purposes, i.e., type 470 of E.C.Company. An aliquot from the starting sample was also brought on the gel slab. An electrophoresis was carried out, and after finishing the electrophoresis, the gelatin side of the gel slab was brought onto a photographic plate, in which holes were formed at spots where proteolytic activity was present. The result is shown in the graph of FIG. 3, in which the distance covered during the second electrophoresis is plotted on the horizontal axis, beginning from the start indicated by A. The fraction number is read from the vertical axis. The spot of the start of the sample is indicated by B. The several components may be distinguished in FIG. 3; they are indicated by a, b, c, d and e (component e formed by for the greatest part the sample), whereby the areas indicated by dotted lines were less visible than the areas indicated by drawn lines. FIG. 3 shows the great separating force of the electrophoresis apparatus according to the invention. The recovery was in the order of 93 percent.

Having described our invention, it should be understood that various modifications of the apparatus of the invention may be made without departing from the spirit or the scope thereof and it should be understood

What is claimed is:

1. A preparative electrophoresis apparatus, comprising a funnel-shaped zone for the electrophoresis gel which is open at the upper side, a zone for circulating a first buffered solution thereabove containing a first electrode, said funnel-shaped zone at its lower end passing into a narrow aperture provided with a bottom enabling liquid to pass but to support the gel, said narrow opening being in connection with an elution chamber directly connected to an outlet, said elution chamber being further connected to a small conical jacket around the funnel-shaped zone, said conical jacket being connected with a zone containing a second electrode and being provided with an inlet for circulating a second buffered solution said inlet being situated between the zone containing the second electrode and the elution chamber, said elution chamber being provided with a downwardly directed outlet for the eluate, the apparatus further comprising means for cooling the liquids and the gel.

2. An apparatus according to claim 1, in which the elution chamber has a volume of 0.01 to 1 ml.

3. An apparatus according to claim 1, in which the elution chamber has a volume of 0.05 to 0.2 ml.

4. An apparatus according to claim 1, wherein the apparatus consists of an upper part comprising a conically shaped part of the wall defining the funnel-shaped zone, an outer wall defining the circulating zone for the first buffered solution, and the first electrode, said upper part fitting to a lower part comprising the outer wall of the conical jacket, the second electrode, the inlet for the second buffered solution and at the lower end of the conical wall a somewhat diverging part cooperating with a plug provided with a central vertical passage, all in a manner such that the side walls of the elution chamber are formed by the lower part, the upper wall thereof by the upper part and the bottom is formed by the plug.

5. An apparatus according to claim 1, wherein the first electrode is height adjustable.

6. An apparatus according to claim 4, wherein the several parts are provided with ground glass joints (Schliffstuecke).

7. An apparatus according to claim 1, wherein the circulating zones for the buffered solutions are provided with overflows.

8. An apparatus according to claim 1, wherein in the circulation zone of the first buffered solution a cooling finger is applied, extending into the funnel-shaped zone, while a cooling vessel is applied about the thin conical jacket and a part of the inlet for the second buffered solution.

9. An apparatus according to claim 8, wherein the cooling finger is provided with an additional jacket ending at the lower end of the zone for the first buffered solution and provided at its lower end with apertures about the circumference allowing the first buffered solution to be introduced.

10. An apparatus according to claim 1, wherein the bottom of the lower end of the funnel-shaped zone consists of sintered glass.

11. An apparatus according to claim 1, wherein the bottom of the elution chamber is provided with a bottom ring to decrease the volume of the elution chamber.

12. An apparatus according to claim 1, substantially as described in the specification.

* * * * *